US007129495B2

(12) United States Patent
Williams et al.

(10) Patent No.: US 7,129,495 B2
(45) Date of Patent: Oct. 31, 2006

(54) METHOD AND APPARATUS FOR TIMING CALIBRATION IN A PET SCANNER

(75) Inventors: John Jay Williams, Hartland, WI (US); Charles William Stearns, New Berlin, WI (US); David Leo McDaniel, Dousman, WI (US); Alexander Ganin, Whitefish Bay, WI (US)

(73) Assignee: General Electric Company, Schenectdady, NY (US)

( * ) Notice: Subject to any disclaimer, the term of this patent is extended or adjusted under 35 U.S.C. 154(b) by 165 days.

(21) Appl. No.: 10/986,792

(22) Filed: Nov. 15, 2004

(65) Prior Publication Data

US 2006/0102845 A1 May 18, 2006

(51) Int. Cl.
*G01T 1/164* (2006.01)
(52) U.S. Cl. .................................. 250/363.03
(58) Field of Classification Search ............ 250/363.03
See application file for complete search history.

(56) References Cited

U.S. PATENT DOCUMENTS

| | | | |
|---|---|---|---|
| 4,575,752 A | 3/1986 | Honda | |
| 4,687,622 A | 8/1987 | Longden | |
| 5,001,657 A | 3/1991 | Yagura et al. | |
| 5,010,321 A | 4/1991 | Larner et al. | |
| 5,036,289 A | 7/1991 | Duran | |
| 5,241,181 A * | 8/1993 | Mertens et al. | 250/363.03 |
| 5,287,183 A | 2/1994 | Thomas et al. | |
| 5,349,374 A | 9/1994 | Arai et al. | |
| 6,327,546 B1 * | 12/2001 | Petrillo et al. | 702/89 |
| 6,403,960 B1 | 6/2002 | Wellnitz et al. | |
| 6,661,013 B1 | 12/2003 | Jagutzki et al. | |
| 6,806,467 B1 | 10/2004 | Funsten et al. | |
| 2002/0014839 A1 | 2/2002 | Jagutzki et al. | |
| 2004/0084625 A1 * | 5/2004 | Williams et al. | 250/363.03 |

* cited by examiner

*Primary Examiner*—David Porta
*Assistant Examiner*—Mindy Vu
(74) *Attorney, Agent, or Firm*—Hunton & Williams, LLP

(57) ABSTRACT

The invention is directed to a method and apparatus for timing calibration in a PET scanner. According to one embodiment, the invention relates to a method for timing calibration in a PET scanner having a plurality of scintillator blocks. The method comprises: detecting, in a first scintillator block, a first radiation event, wherein the first scintillator block time-stamps the first radiation event; detecting, in a second scintillator block that is adjacent to the first scintillator block, a second radiation event that corresponds to the first radiation event, wherein the second scintillator block time-stamps the second radiation event; and determining a timing characteristic of the first scintillator block with respect to the second scintillator block based on a comparison between the time-stamps of the first radiation event and the second radiation event.

25 Claims, 8 Drawing Sheets

METHOD AND APPARATUS FOR TIMING CALIBRATION IN A PET SCANNER

BACKGROUND OF THE INVENTION

The present invention relates generally to the field of medical imaging and more particularly to a method and apparatus for timing calibration in a PET scanner.

Positron emission tomography (PET) is a technique commonly used in clinical medicine and biomedical research to create images of a living body in its active state. PET scanners can produce images that illustrate various biological process and functions. In a PET scan, the patient is initially injected with a radioactive substance known as a PET isotope. The injected PET isotope can act as a tracer when it becomes involved in certain physiological processes in the patient's body. Typical positron-emitting PET isotopes include $^{11}C$, $^{13}N$, $^{15}O$ and $^{18}F$. When positrons are emitted within the body, they combine with electrons in the neighboring tissues and become annihilated. The annihilation event mostly result in a pair of gamma photons being released in opposite directions. The gamma photons are then detected by a detector ring like the one shown in FIG. 1. The detector ring 100 may comprise a number of detectors or detector channels (e.g., 11, 12, 13, and 14 etc.) each having a scintillator block and a photomultiplier tube (PMT). For example, detector 11 comprises a scintillator block 112 and a PMT 114, detector 12 comprises a scintillator block 122 and a PMT 124, and so on.

In operation, a patient 102, who has been injected with a PET isotope, may be positioned in the detector ring 100. One pair of gamma photons from a body part 104 may be detected along a line of response (LOR) 116 on opposite sides of the patient, for example. Another pair of gamma photons from the body part 104 may be detected along another LOR 136. Along the LOR 116, the gamma photons may cause substantially simultaneous scintillations in the scintillator blocks 112 and 122. These scintillations may then be amplified and converted into electrical signals by the PMTs 114 and 124 respectively. Subsequent electronic circuitry may determine whether these substantially simultaneous scintillations are coincidence events, that is, radiation events originating from the same annihilation event in the patient 102's body. Data associated with coincidence events along a number of LORs may be collected and further processed to reconstruct two-dimensional (2-D) tomographyic images. Some modern PET scanners can operate in a three-dimensional (3-D) mode, where coincidence events from different detector rings positioned along the axial direction are counted to obtain 3-D tomographic images. An exemplary PET scanner with multiple detector rings is shown in FIG. 2, where the PMTs are not shown. As shown, the PET scanner 200 comprises three detector rings 22, 24 and 26.

One aspect of PET detection methods is Time-Of-Flight PET (TOF PET), where the arrival time of a pair of coincident photons is measured. In non-TOF PET, the arrival time is ignored and the annihilation is equally probable to have occurred along the full extension of the LOR. In TOF PET, upon detection of a radiation event (e.g., a gamma photon), the scintillator block at the detection locale time-stamps the detected radiation event. Incorporation of the arrival time gives more weight to the more probable locations of the emission point for each event, thereby reducing statistical uncertainty in the reconstructed images. For the TOF PET technique to be successful, the PET scanner has to maintain a high timing resolution (e.g., within a fraction of a nanosecond). The timing resolution greatly depends on how two scintillator blocks on opposite sides of the detector ring time-stamp their respectively detected radiation events. If the two opposite blocks have different timing characteristics, radiation events detected along the LOR connecting the two blocks may exhibit a timing drift, therefore causing difficulty in reconstructing PET images or causing errors in the reconstructed images. Timing drifts are typically caused by changes in time delay inside the PMTs, change in thresholds in the time-stamping circuits, master clock skew, or transmission delays in the cables. Any of these changes can be caused by either actual component change or thermal effects.

Due to the timing resolution requirements, it is typically necessary to monitor and calibrate the timing drift for a PET scanner on a frequent basis. This type of timing calibration is traditionally performed by placing a radiation source at the center of the detector rings and adjusting each detector channel until the coincidence events registered by each channel is maximized and relatively uniform around the entire ring. The use of an external radiation source requires interruptions to normal operation of the PET scanner. As a result, the traditional timing calibration cannot be performed concurrently with data acquisition from patients.

In view of the foregoing, it would be desirable to provide a more efficient solution for timing calibration in a PET scanner.

BRIEF SUMMARY OF THE INVENTION

The present invention is directed to a method and apparatus for timing calibration in a PET scanner that overcomes drawbacks of known systems and methods.

According to one embodiment, the invention relates to a method for timing calibration in a PET scanner having a plurality of scintillator blocks. The method comprises: detecting, in a first scintillator block, a first radiation event, wherein the first scintillator block time-stamps the first radiation event; detecting, in a second scintillator block that is adjacent to the first scintillator block, a second radiation event that corresponds to the first radiation event, wherein the second scintillator block time-stamps the second radiation event; and determining a timing characteristic of the first scintillator block with respect to the second scintillator block based on a comparison between the time-stamps of the first radiation event and the second radiation event.

According to another embodiment, the invention relates to a method for timing calibration in a PET scanner having a plurality of scintillator blocks. The method comprises: detecting a plurality of radiation events, wherein each of the plurality of radiation events is associated with one of the plurality of scintillator blocks and locally time-stamped; identifying at least one event pair each comprising a first radiation event and a second radiation event, wherein the first radiation event is detected in a first scintillator block, the second radiation event is detected in a second scintillator block that is adjacent to the first scintillator block, and the second radiation event substantially coincides with the first radiation event; and determining a timing characteristic associated with the first scintillator block based on a comparison between the time-stamps of the first radiation event and the second radiation event.

According to yet another embodiment, the invention relates to a method for timing calibration in a PET scanner having a plurality of scintillator blocks. The method comprises: performing an initial timing calibration of the PET scanner based on an external radiation source; measuring a first timing characteristic a scintillator block based on an intrinsic radiation; measuring, at a later time, a second timing characteristic for the scintillator block based on the intrinsic radiation; and detecting a timing drift for the scintillator block based on a comparison of the first timing characteristic and the second timing characteristic.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF THE INVENTION

Reference will now be made in detail to exemplary embodiments of the invention, examples of which are illustrated in the accompanying drawings.

Figure 3:
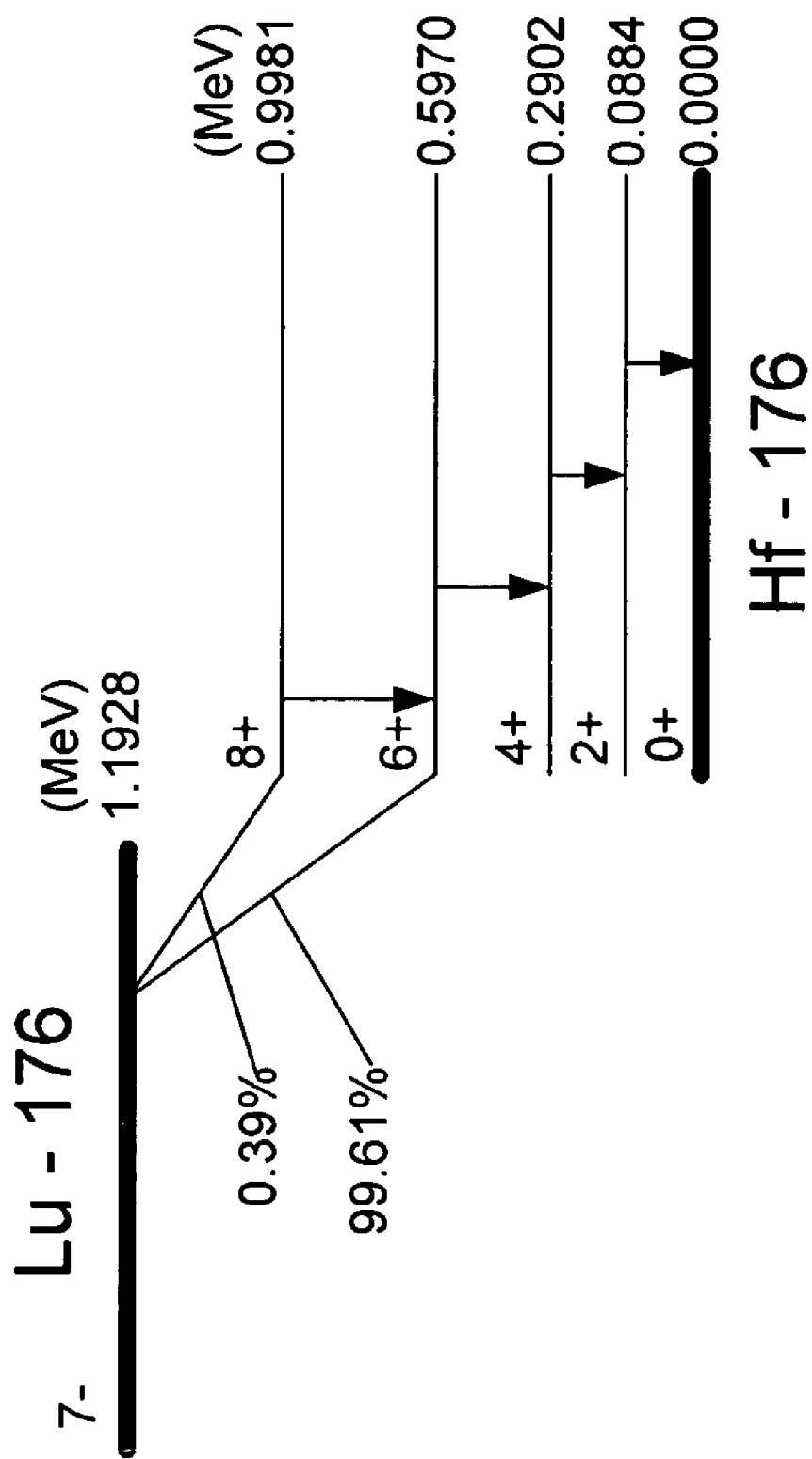
FIG. 3 is a diagram illustrating the energy states involved in a lutetium beta decay.

One technical effect of the invention is to provide a method and apparatus for timing calibration in a PET scanner, as set forth in the Brief Summary of the Invention, above and as more fully described here in the Detailed Description of the Invention Embodiments of the present invention may achieve timing calibration in a PET scanner without using any external radiation sources. Instead, timing drifts may be measured based on intrinsic radiation events in the scintillator blocks. For example, many high-speed scintillators for TOF PET contain lutetium (Lu), a naturally radioactive substance. FIG. 3 is a diagram illustrating the energy states involved in a lutetium beta decay. As shown, multiple gamma rays may be emitted when lutetium ($^{176}$Lu) decays to hafnium ($^{176}$Hf). The total energy of these gamma rays is 597 keV. According to embodiments of the present invention, these gamma rays may be detected for timing calibration purposes. Though only lutetium is described here as a source of internal radiation, other radioactive elements or isotopes may also be incorporated in a scintillator material to produce desired internal radiation that is useful for timing calibration. For example, uranium (U), thorium (Th), hafnium (Hf), samarium (Sm) and potassium (K) may be candidates for radioactive scintillators since they are also capable of decays that produce at least two concurrent photons.

Figure 1:
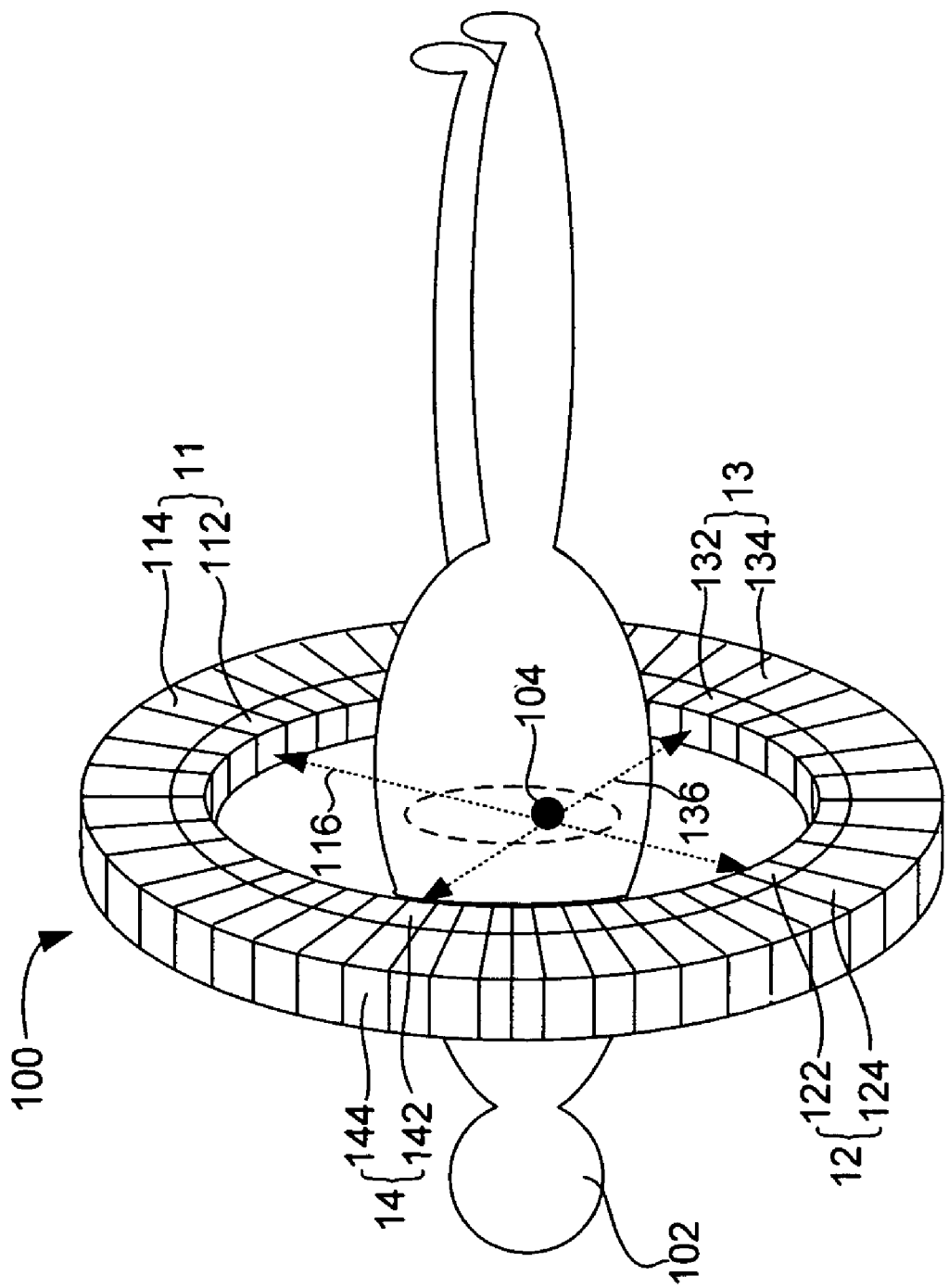
FIG. 1 is a concept view of a PET system.
Figure 2:
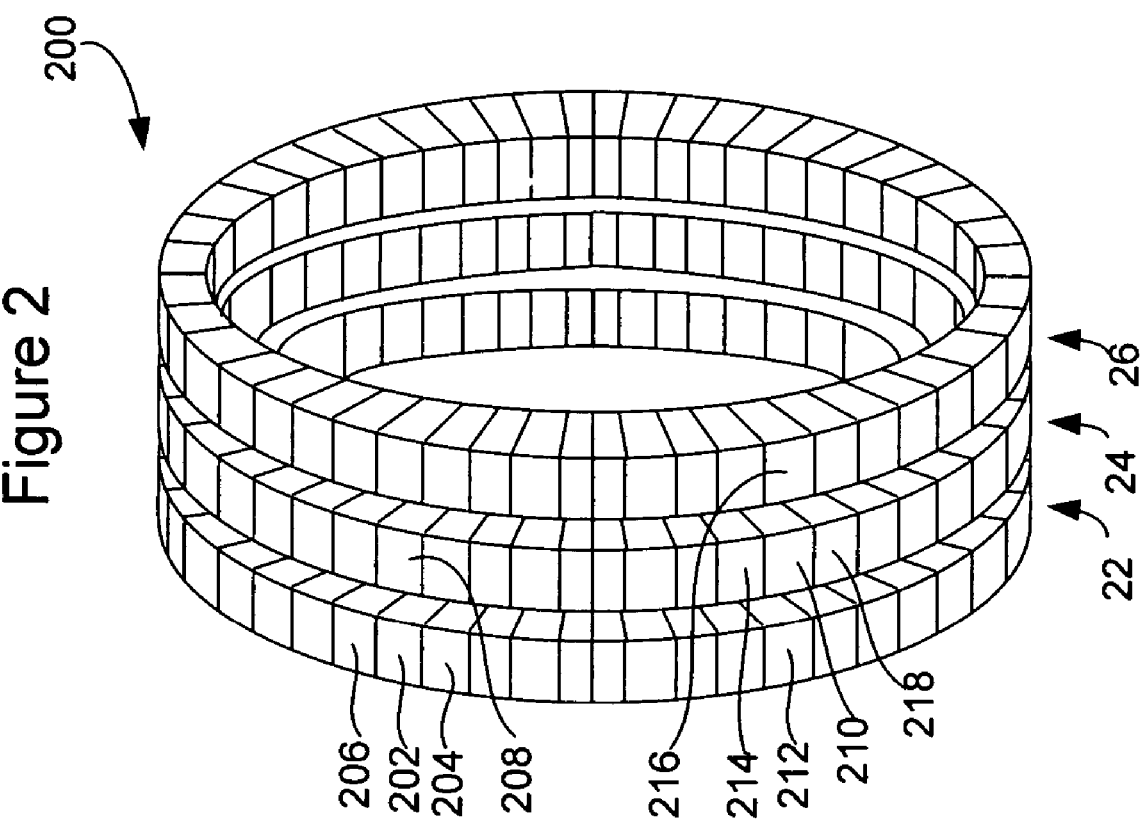
FIG. 2 illustrates an exemplary PET scanner with multiple detector rings.
Figure 4:
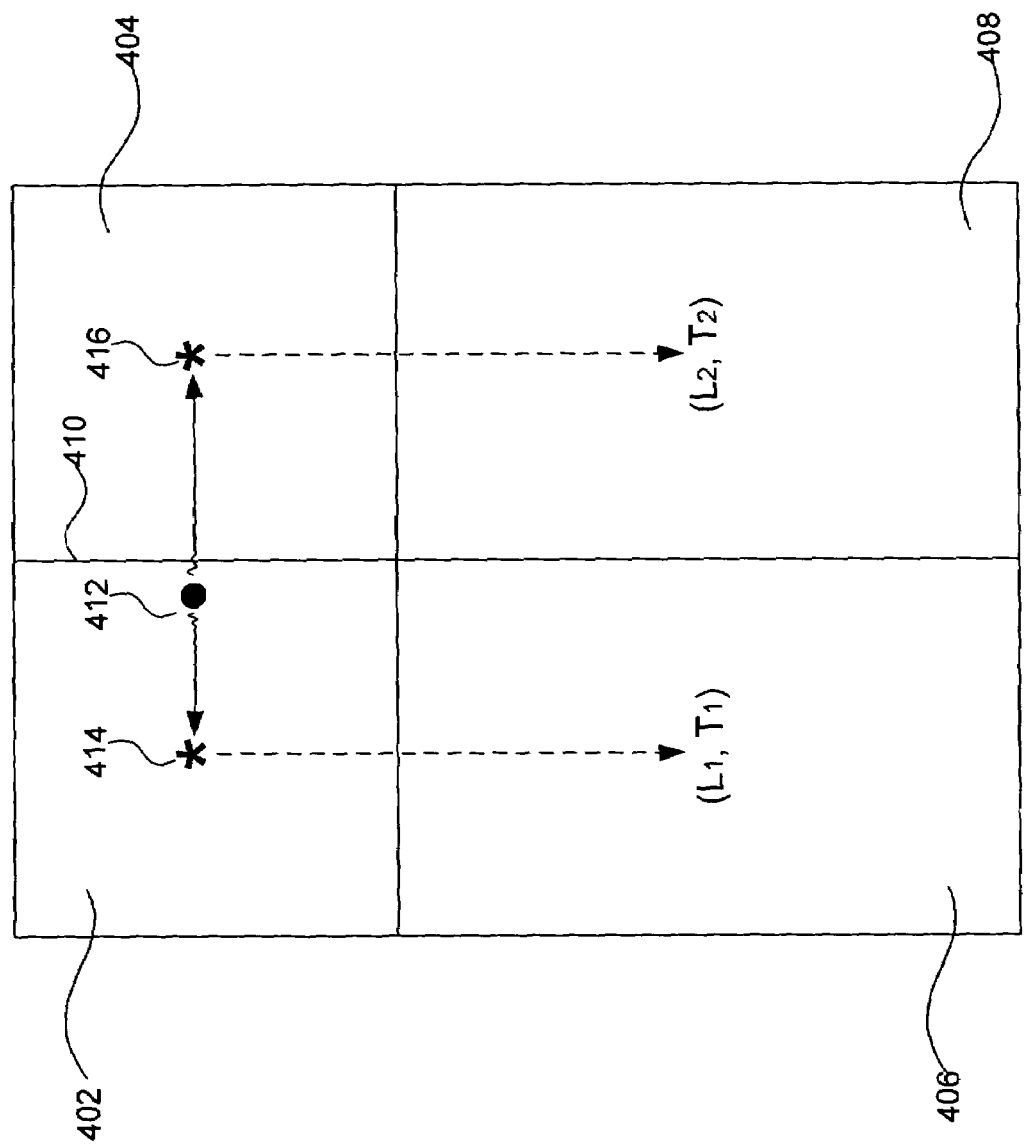
FIG. 4 illustrates an exemplary detection of intrinsic radiation in two neighboring scintillator blocks according to an embodiment of the present invention.

FIG. 4 illustrates an exemplary detection of an intrinsic radiation event in two neighboring scintillator blocks according to an embodiment of the present invention. In FIG. 4, there are shown a first scintillator block 402, a second scintillator block 404, and their respective detection electronics (e.g., PMTs) 406 and 408. The block 402 and the block 404 are adjacent to each other and share an edge 410. Apart from the neighboring block 404, the block 402 may have other neighboring blocks not shown here. In a 3-D PET scanner like the one shown in FIG. 2, each scintillator block may have 3–4 neighboring blocks with which it shares an edge. For example, in FIG. 2, the block 202 has three neighboring blocks 204, 206, and 208. The block 210 has four neighboring blocks 212, 214, 216, and 218.

When an intrinsic radiation event (e.g., Lu beta decay) occurs in the block 402, there is a reasonable probability that some of the resulting gamma rays will escape to the neighboring blocks. For example, an intrinsic radiation event 412 may take place relatively close to the edge 410. Some of the resulting gamma photons may be detected in the block 402 as a radiation event 414, while some gamma photons may escape into the block 404 and be detected therein as a radiation event 416. The detected events 414 and 416 may be further processed by the detection electronics 406 and 408 respectively, where the event 414 may be assigned a location ID $L_1$ and a time-stamp $T_1$, and the event 416 may be assigned a location ID $L_2$ and a time-stamp $T_2$. The location IDs indicate in which block the events are detected, and the time-stamps indicate the detection time for the events. Since the events 414 and 416 originate from the same intrinsic radiation event 412, they are coincidence events. Absent any difference between the timing characteristics of the blocks 402 and 404, the time-stamps $T_1$ and $T_2$ should be substantially the same. However, if the block 402 becomes slow, for example, the event 414 may appear to have arrived earlier than the event 416. Therefore, by comparing the time-stamps of coincidence events detected in two neighboring blocks, a timing difference between the blocks may be determined.

Figure 5:
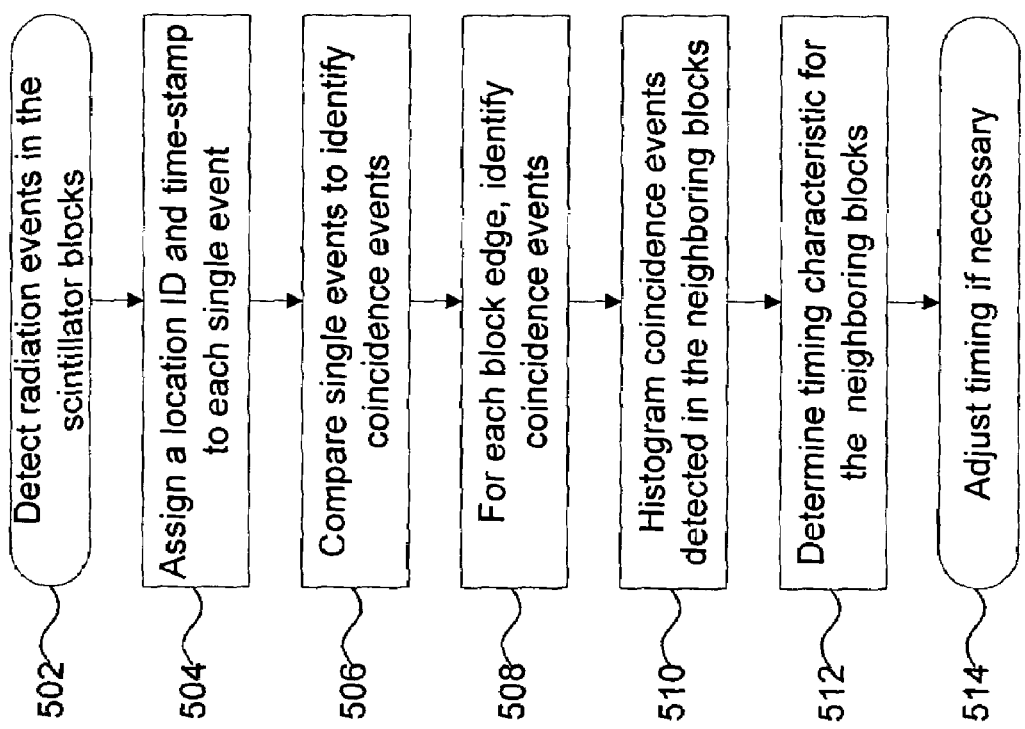
FIG. 5 is flow chart illustrating an exemplary method for timing calibration in a PET scanner according to an embodiment of the invention.

FIG. 5 is a flow chart illustrating an exemplary method for timing calibration in a PET scanner according to an embodiment of the invention. The timing calibration may be performed during time periods when the PET scanner is not in use (e.g., overnight or in between patients).

In step 502, radiation events may be detected in the various scintillator blocks in the PET detector ring. Based on the specific type of intrinsic radiation, different energy windows may be set up to accept the resulting gamma photons. That is, the detectors may be configured to accept only those radiation events that fall in certain energy ranges. Lu beta decay, for example, has a total decay energy of 597 keV. In order to detect a same event in two blocks, it is required that one portion of the 597 keV be detected in one block and the remainder portion of the 597 keV be detected in the other block. The possible energy splits between the two blocks may be roughly: 300 to 300 keV, 500 to 100 keV, 400 to 200 keV. Because of these multiple energies, it may be desirable to have multiple and concurrent energy windows to accept the gamma photons. Such a multiple energy window setup is not typically provided in conventional PET systems. The gamma photons from the intrinsic radiation may cause scintillations which are then converted by PMTs to electric signals proportionate to the incident energy of the photons. The front-end detectors may select only those events that fall within the predetermined energy windows. The multiple energy windows may not only allow events to be selected more closely, but may also facilitate semi-independent measurements at the different energies.

In step 504, each single event detected/selected may be assigned a location ID and a time-stamp. Then data associated with the single events may be passed on to a coincidence processing module. In each clock cycle (typically 250 ns), the coincidence processing module may receive many events from the scintillator blocks.

In step 506, each single event may be compared with other single events to identify coincidence events. Two single events that are detected within a short time interval may have originated from a shared intrinsic radiation event, therefore they may be considered coincidence events.

In step 508, coincidence events may be identified for each block edge. That is, for each block edge adjoining two neighboring blocks, coincidence events detected in either block may be identified. According to one embodiment of the present invention, a location map may be loaded in the coincidence processing module, so that only those events from two neighboring blocks are considered.

In step 510, the coincidence events from every two neighboring blocks may be histogrammed based on two timing difference channels. One channel may be set up to accept events that are close to but earlier than the same time, and the other channel may be set up to accept events that are close to but later than the same time. For example, if coincidence events $E_1$ (time-stamped $t_1$) and $E_2$ (time-stamped $t_2$) are detected in two neighboring blocks $B_1$ and $B_2$ respectively, it may be determined, based on detector energy windows, that $E_1$ and $E_2$ originated from an intrinsic radiation event in the block $B_1$. A timing difference ($\Delta t = t_2 - t_1$) may be calculated. If $\Delta t$ equals zero, the two neighboring blocks may be deemed to have substantially the same timing characteristics. If $\Delta t$ is less than zero (e.g., −1 time unit), the same intrinsic radiation event observed in the block $B_1$ appears to be later than observed in the block $B_2$, which indicates the block $B_1$ is 1 time unit faster in timing than the block $B_2$. On the other hand, if $\Delta t$ is greater than zero (e.g., +2 time units), the block $B_1$ may be 2 time units slower in timing than the block $B_2$. By histogramming coincidence event pairs in neighboring blocks based on time-stamp differences, a number of individual timing comparisons between a particular block and its neighbor(s) may be accumulated and analyzed. For example, a distribution of the timing comparisons may be indicative of the particular block's timing characteristics. Or the distribution of the timing comparisons relative to the above-mentioned timing difference channels may be show the particular block's timing with respect to its neighbor(s). That is, one timing difference channel may be called a "NEAR but LATER" channel, which accepts coincidence event pairs whose timing differences ($\Delta t$) are less than zero. And another timing difference channel may be called a "NEAR but EARLIER" channel, which accepts coincidence event pairs whose timing differences ($\Delta t$) are greater than zero.

Figure 6:
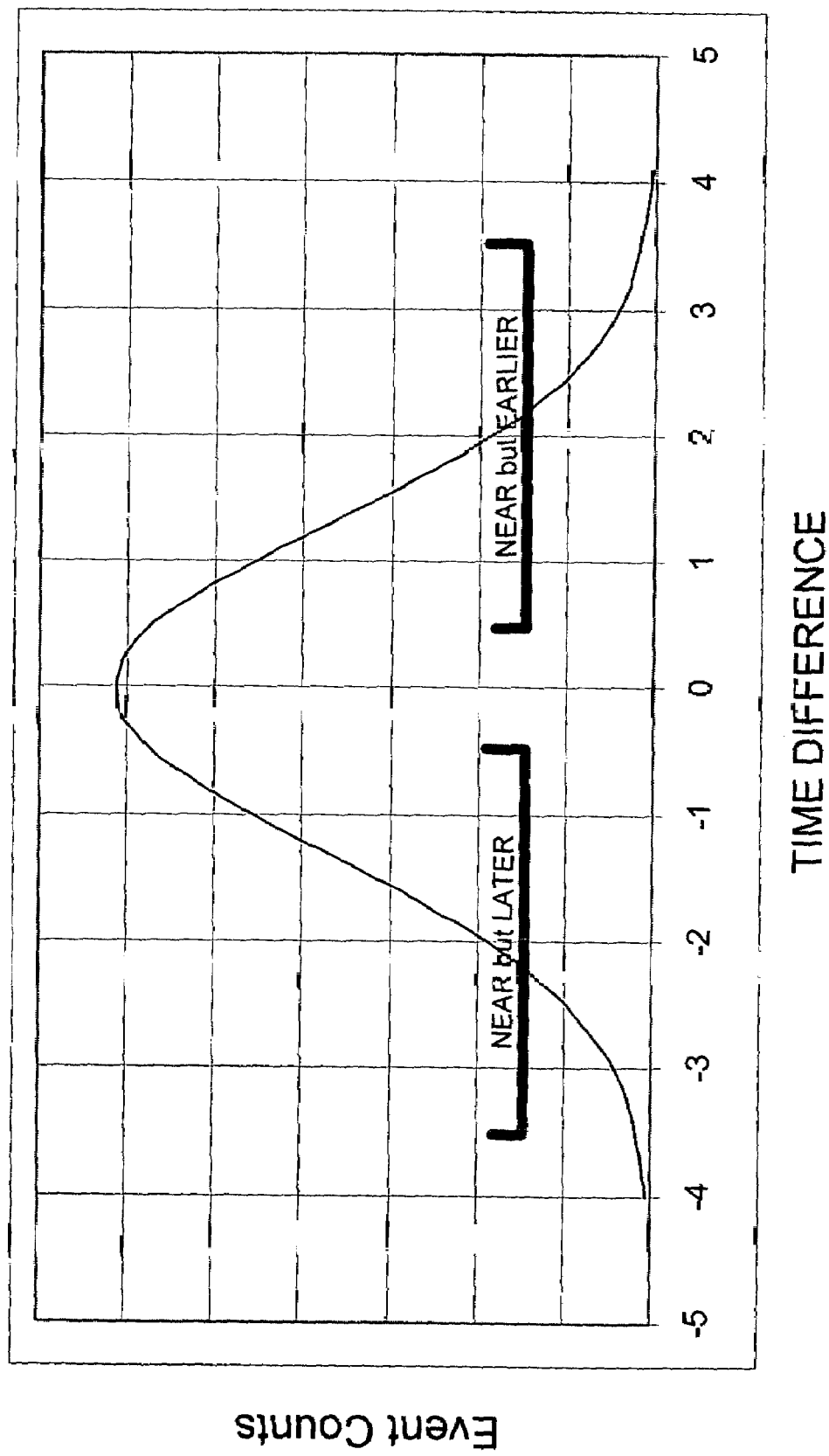
FIG. 6 shows an exemplary histogram for timing calibration in a PET scanner according to an embodiment of the invention.

One example of event histogramming in the timing difference channels is shown in FIG. 6. As shown, coincidence events are histogrammed based on their perceived timing difference with respect to the expected zero. The vertical axis represents event counts for the coincidence events recorded. If the timing characteristic of a block is consistent with the expected zero, the histogram will not lean toward either the "NEAR but LATER" or the "NEAR but EARLIER" timing difference channels. Instead, the histogram will be centered at the zero time difference point.

Figure 7:
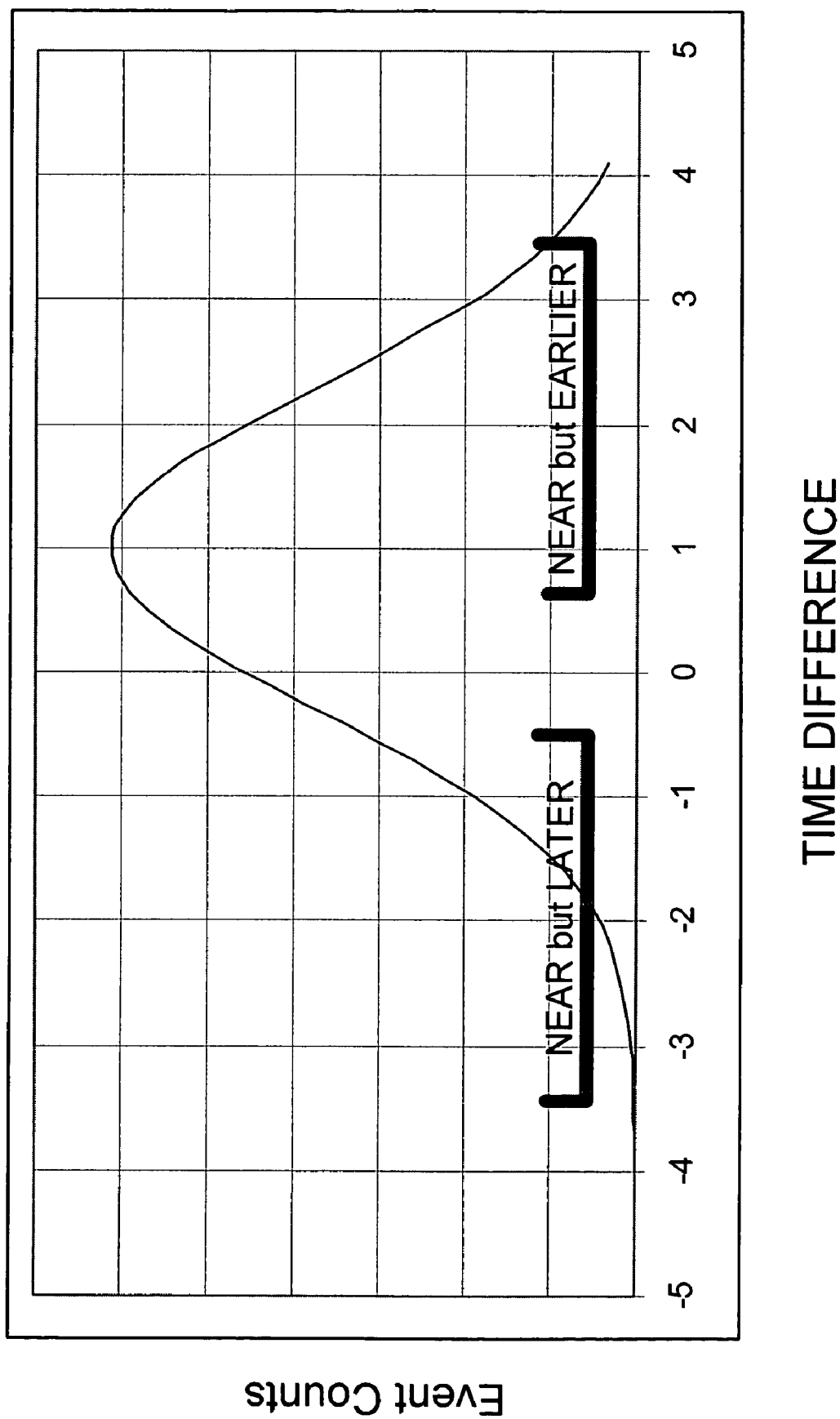
FIG. 7 shows another exemplary histogram for timing calibration in a PET scanner according to an embodiment of the invention.
Figure 8:
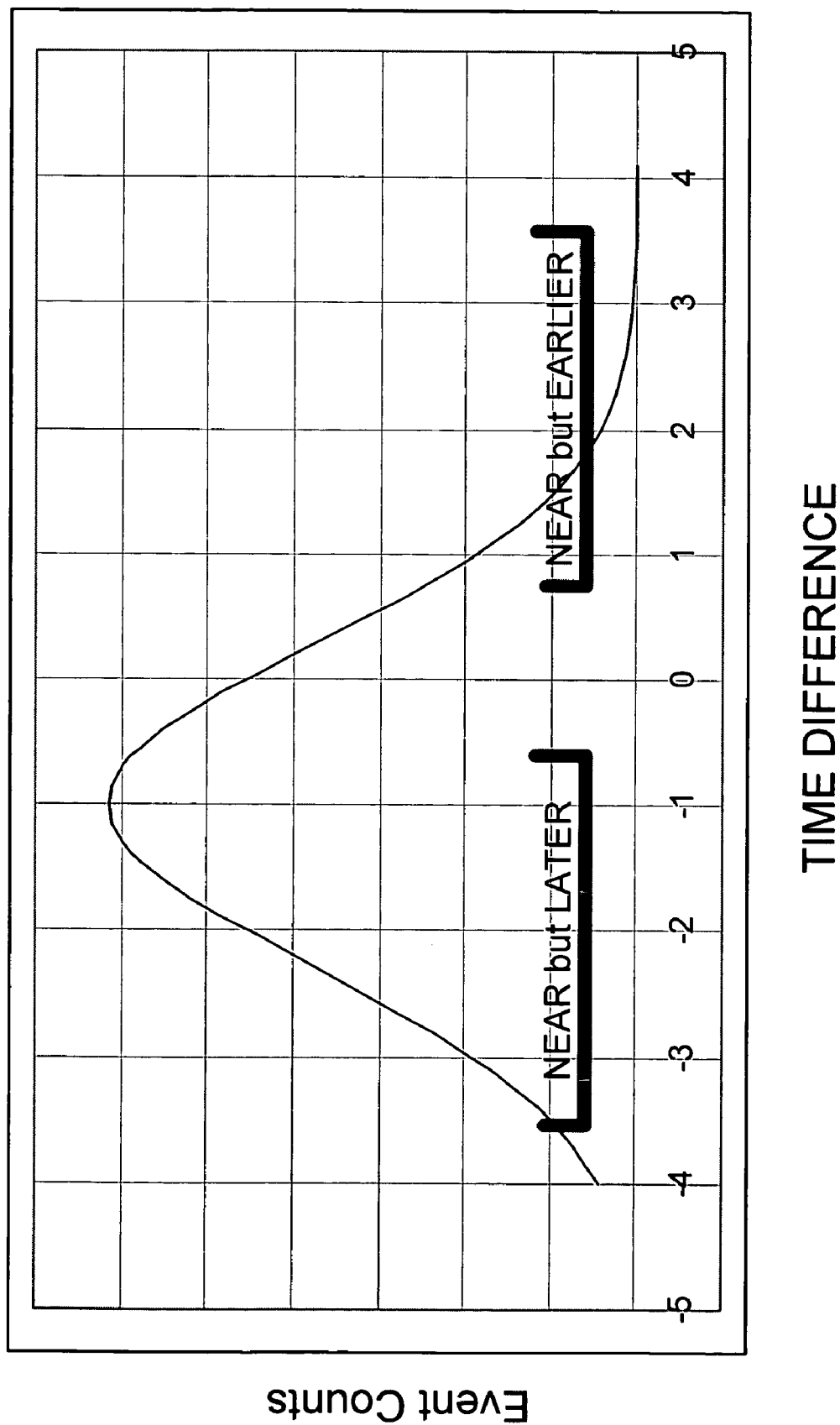
FIG. 8 shows yet another exemplary histogram for timing calibration in a PET scanner according to an embodiment of the invention.

On the other hand, if a block becomes one time unit slower than its neighbors, for example, the histogram will be shifted from the zero time difference point. FIG. 7 shows a histogram of coincidence events as observed in a slower block according to an embodiment of the present invention. Since this block is slower than its neighbors, radiation events that originate from the neighboring blocks are seen in this block as if they arrived earlier than the time at which they actually arrived. Therefore, the histogram in FIG. 7 is shifted to the right by one time unit. FIG. 8 shows a histogram of the same events as observed in a neighboring block next to the slower block. When seen from the perspective of the neighboring block, these same events appear as if they have arrived later than the time at which they actually arrived. As a result, the histogram in FIG. 8 is shifted to the left by one time unit.

Based on the observation of the histograms, timing characteristics for every two neighboring blocks may be determined in step 512. The histograms may be displayed for visual inspection by an operator of the PET scanner. Or the histogram data may be directly processed by a computer to determine the existence and amount of timing drifts. It should be noted that, although the distribution of timing comparisons in FIGS. 6–8 are shown as continuous curves, an actual distribution may or may not be continuous.

In step 514, the timing characteristic for each block may be adjusted if necessary. The adjustment may be achieved by changing the circuit delay in the detection electronics associated with the block, for example. Both manual or automated adjustments are possible.

According to embodiments of the invention, a retrospective analysis may be performed to select the above-described timing comparisons. Depending on the geometry and location of a scintillator block, histogrammed timing comparisons for all its neighboring blocks may not be equally indicative of its actual timing characteristics. Therefore, it may be desirable to select timing comparisons from accumulated histograms in calculating the block-level timing changes. For example, one block's timing comparisons with its various neighbors may be weighted in the timing calculation.

According to further embodiments of the present invention, there may be at least two types of timing calibration, one with an external radiation source and one without. As described above, without any external radiation source, the timing calibration may be done by measuring and eliminating the timing difference between each pair of neighboring blocks. Alternatively, an external radiation source may be used for an initial timing calibration of the PET system. This external-source-based calibration may be one of those methods generally known in the PET industry. This initial calibration may place the PET system in a desired state in terms of timing. Upon this initial calibration, the initial timing characteristics of the individual blocks may be measured based on intrinsic radiation. The initial timing characteristics may then be used as a reference for subsequent timing drifts. When it is time to calibrate the timing again, the present timing characteristics of the individual blocks may be measured based on the intrinsic radiation. And the present timing characteristics may be compared with the initial timing characteristics. If the change is significant, the PET system may be calibrated again using the external radiation source. Otherwise, the PET system may be deemed adequately calibrated.

The above-described timing calibration method can be implemented without much change to existing hardware in a PET scanner. When the PET scanner goes into time-calibration mode, the existing coincidence processing module can simply be reprogrammed to process coincidence events in neighboring blocks instead of those in opposite blocks. And the detector electronics may be switched to appropriate energy acceptance windows. Further, the timing calibration may be performed in a flexible timeframe, either over a long period of time (e.g., overnight) or in a short period of time (e.g., in between patients). The overnight long-term data collection can improve statistical accuracy of the timing calibration. And the in-between-patients type of data collection can provide more real-time timing check.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents.

What is claimed is:

1. A method for timing calibration in a PET scanner having a plurality of scintillator blocks, the method comprising:
    detecting, in a first scintillator block, a first radiation event, wherein the first scintillator block time-stamps the first radiation event;
    detecting, in a second scintillator block that is adjacent to the first scintillator block, a second radiation event that corresponds to the first radiation event, wherein the second scintillator block time-stamps the second radiation event; and
    determining a timing characteristic of the first scintillator block with respect to the second scintillator block based on a comparison between the time-stamps of the first radiation event and the second radiation event.

2. The method according to claim 1, wherein the first radiation event and the second radiation event are associated with an intrinsic radiation.

3. The method according to claim 2, wherein the intrinsic radiation originates from a beta decay of lutetium ($^{176}$Lu).

4. The method according to claim 1, wherein:
    the first radiation event is detected in a first energy window; and
    the second radiation event is detected in a second energy window.

5. The method according to claim 1 further comprising:
    adjusting the timing characteristic associated with the first scintillator block.

6. The method according to claim 1 further comprising:
    detecting, in the first scintillator block, a first plurality of radiation events over a predetermined period of time, wherein the first scintillator block time-stamps each of the first plurality of radiation events;
    detecting, in the second scintillator block, a second plurality of radiation events over the predetermined period of time, wherein the second scintillator block time-stamps each of the second plurality of radiation events;
    identifying coincidence event pairs by matching the first plurality of radiation events with the second plurality of radiation events; and
    determining the timing characteristic of the first scintillator block with respect to the second scintillator block based on timing comparisons between the time-stamps of the first plurality of radiation events and the second plurality of radiation events.

7. The method according to claim 6 further comprising:
    setting up two timing difference channels to accept the coincidence event pairs based on their timing comparisons, wherein one timing difference channel accepts the coincidence event pairs that appear to arrive earlier in the first scintillator block than in the second scintillator block, and the other timing difference channel accepts the coincidence event pairs that appear to arrive later in the first scintillator block than in the second scintillator block; and
    determining the timing characteristic of the first scintillator block with respect to the second scintillator block based on a distribution of the timing comparisons relative to the two timing difference channels.

8. The method according to claim 7 further comprising:
    retrospectively selecting one or more timing comparisons for determination of the timing characteristic.

9. A method for timing calibration in a PET scanner having a plurality of scintillator blocks, the method comprising:
    detecting a plurality of radiation events, wherein each of the plurality of radiation events is associated with one of the plurality of scintillator blocks and locally time-stamped;
    identifying at least one event pair each comprising a first radiation event and a second radiation event, wherein the first radiation event is detected in a first scintillator block, the second radiation event is detected in a second scintillator block that is adjacent to the first scintillator block, and the second radiation event substantially coincides with the first radiation event; and
    determining a timing characteristic associated with the first scintillator block based on a comparison between the time-stamps of the first radiation event and the second radiation event.

10. The method according to claim 9, wherein the plurality of radiation events are associated with an intrinsic radiation.

11. The method according to claim 10, wherein the intrinsic radiation originates from a beta decay of lutetium ($^{176}$Lu).

12. The method according to claim 9, wherein:
    the first radiation event is detected in a first energy window; and
    the second radiation event is detected in a second energy window.

13. The method according to claim 9 further comprising:
    adjusting the timing characteristic associated with the first scintillator block.

14. The method according to claim 9 further comprising:
    retrospectively selecting one or more timing comparisons for determination of the timing characteristic.

15. A system for timing calibration in a PET scanner having a plurality of scintillator blocks, the system comprising:
    means for detecting, in a first scintillator block, a first radiation event, wherein the first scintillator block time-stamps the first radiation event;
    means for detecting, in a second scintillator block that is adjacent to the first scintillator block, a second radiation event that corresponds to the first radiation event, wherein the second scintillator block time-stamps the second radiation event; and
    means for determining a timing characteristic associated with the first scintillator block based on a comparison between the time-stamps of the first radiation event and the second radiation event.

16. The system according to claim 15 further comprising:
means for adjusting the timing characteristic associated with the first scintillator block.

17. A computer readable medium having code for causing a processor to perform timing calibration in a PET scanner having a plurality of scintillator blocks, the computer readable medium comprising:
code adapted to detect, in a first scintillator block, a first radiation event, wherein the first scintillator block time-stamps the first radiation event;
code adapted to detect, in a second scintillator block that is adjacent to the first scintillator block, a second radiation event that corresponds to the first radiation event, wherein the second scintillator block time-stamps the second radiation event; and
code adapted to determine a timing characteristic associated with the first scintillator block based on a comparison between the time-stamps of the first radiation event and the second radiation event.

18. The computer readable medium according to claim 17 further comprising:
code adapted to adjust the timing characteristic associated with the first scintillator block.

19. A system for timing calibration in a PET scanner having a plurality of scintillator blocks, the system comprising:
means for detecting a plurality of radiation events, wherein each of the plurality of radiation events is associated with one of the plurality of scintillator blocks and locally time-stamped;
means for identifying at least one event pair each comprising a first radiation event and a second radiation event, wherein the first radiation event is detected in a first scintillator block, the second radiation event is detected in a second scintillator block that is adjacent to the first scintillator block, and the second radiation event substantially coincides with the first radiation event; and
means for determining a timing characteristic associated with the first scintillator block based on a comparison between the time-stamps of the first radiation event and the second radiation event.

20. The system according to claim 19 further comprising:
means for adjusting the timing characteristic associated with the first scintillator block.

21. The system according to claim 19 further comprising:
means for retrospectively selecting one or more timing comparisons for determination of the timing characteristic.

22. A computer readable medium having code for causing a processor to perform timing calibration in a PET scanner having a plurality of scintillator blocks, the computer readable medium comprising:
code adapted to detect a plurality of radiation events, wherein each of the plurality of radiation events is associated with one of the plurality of scintillator blocks and locally time-stamped;
code adapted to identify at least one event pair each comprising a first radiation event and a second radiation event, wherein the first radiation event is detected in a first scintillator block, the second radiation event is detected in a second scintillator block that is adjacent to the first scintillator block, and the second radiation event substantially coincides with the first radiation event; and
code adapted to determine a timing characteristic associated with the first scintillator block based on a comparison between the time-stamps of the first radiation event and the second radiation event.

23. The computer readable medium according to claim 22 further comprising:
code adapted to adjust the timing characteristic associated with the first scintillator block.

24. The computer readable medium according to claim 22 further comprising:
code adapted to retrospectively select one or more timing comparisons for determination of the timing characteristic.

25. A method for timing calibration in a PET scanner having a plurality of scintillator blocks, the method comprising:
performing an initial timing calibration of the PET scanner based on an external radiation source;
measuring a first timing characteristic a scintillator block based on an intrinsic radiation;
measuring, at a later time, a second timing characteristic for the scintillator block based on the intrinsic radiation; and
detecting a timing drift for the scintillator block based on a comparison of the first timing characteristic and the second timing characteristic.

* * * * *